United States Patent [19]
Orimo et al.

[11] Patent Number: 5,146,559
[45] Date of Patent: Sep. 8, 1992

[54] SYSTEM FOR RECOGNIZING PROGRAM CONSTITUTION WITHIN A DISTRIBUTED PROCESSING SYSTEM BY COLLECTING CONSTITUTION MESSAGES GENERATED BY DIFFERENT PROCESSORS

[75] Inventors: Masayuki Orimo, Kawasaki; Kinji Mori, Yokohama; Yasuo Suzuki, Ebina; Katsumi Kawano, Fuchuu; Minoru Koizumi, Yokohama; Kozo Nakai, Katsuta; Hirokazu Kasahima, Hitachi, all of Japan

[73] Assignee: Hitachi, Ltd., Tokyo, Japan

[21] Appl. No.: 101,961

[22] Filed: Sep. 28, 1987

[51] Int. Cl.$^5$ .............................. G06F 15/80
[52] U.S. Cl. .................. 395/200; 364/229; 364/260.1; 364/264.2; 364/284.3; 364/DIG. 1; 395/800
[58] Field of Search ... 364/200 MS File, 900 MS File

[56] References Cited

U.S. PATENT DOCUMENTS

| | | | |
|---|---|---|---|
| 4,342,083 | 7/1982 | Freedman et al. | 364/200 |
| 4,412,281 | 10/1983 | Works | 364/200 |
| 4,456,994 | 6/1984 | Segara | 371/16 |
| 4,558,413 | 12/1985 | Schmidt et al. | 364/300 |
| 4,627,055 | 12/1986 | Mori et al. | 371/16 |
| 4,663,704 | 5/1987 | Jones et al. | 364/188 |

OTHER PUBLICATIONS

N. P. Kronenberg et al., "VAX Clusters; A Loosely-Coupled Distributed System", *ACM Trans. on Comp. Systems*, vol. 4, No. 1986, May 1986, New York.
D. Lee et al., "A Reliable Datagram Transport Protocol on Local Area Networks", *Computer Communication Review*, vol. 16, No.3, Aug. 5, 1986, New York.
R. W. Dobinson et al., "Interfacing to Ethernet Using VLSI Protocol Chips", *Interfaces in Computer*, vol. 3, No. 34, Sep. 1985, Lousanne, Switzerland.
M. Kishi et al., "DDDP: A Distributed Data Driven Processor", *The 10th Annual International Symposium on Computer Architecture*, 1983, R.I. T. Stockholm Sweden.

*Primary Examiner*—Thomas C. Lee
*Assistant Examiner*—Ayni Mohamed
*Attorney, Agent, or Firm*—Antonelli, Terry, Stout & Kraus

[57] ABSTRACT

The present invention consists in that, when a program constitution in each of processors connected to a common transmission line has changed, a message to this effect is broadcast to the common transmission line, and that, when the message has been received from the common transmission line, information on programs stored in the own processor is broadcast to the common transmission line, whereby the messages indicating the program constitutions in the individual processors are automatically broadcast onto the transmission line at the changes of the constitutions of programs. Besides, in a system wherein a series of processes are executed by a plurality of programs, the relation among programs according to the flow of the series of processes can be recognized using information on the input/output data of each of the programs.

10 Claims, 16 Drawing Sheets

SYSTEM FOR RECOGNIZING PROGRAM CONSTITUTION WITHIN A DISTRIBUTED PROCESSING SYSTEM BY COLLECTING CONSTITUTION MESSAGES GENERATED BY DIFFERENT PROCESSORS

BACKGROUND OF THE INVENTION

1. Field of the Invention

The present invention relates, in a distributed processing system having a plurality of processors, to a distributed processing system and method in which the constitution of application programs operating within the individual processors is automatically recognized at the change of the program constitution, or in which the relation among the programs is recognized.

2. Description of the Prior Art

Heretofore, in a distributed processing system having a plurality of processors connected to a common transmission line, a method by which programs for executing the series of processes respectively are distributively stored in the individual processors, and the program of each processor is started when data necessary for executing this program have been completely gathered from the transmission line into the own processor, has been disclosed in, for example, the official gazette of U.S. Pat. No. 4627055.

This method permits the respective processors to distributively execute the corresponding program without requiring a management processor for managing the whole system.

In addition, the inventors have proposed in Japanese Patent Application No. 129378/1985 a software developing method by which, in the distributed processing system stated above, one or more of the processors is/are used for developing a program, the program developed by the development processor is broadcast to the common transmission line, and any of the processors requiring the program gathers it from the common transmission line and stores it in the own processor on its own judgement.

Owing to the above method, it becomes possible that the series of processes be executed without the necessity of a master for controlling the whole system and that, also in the program development, the program be developed by each development processor and be loaded in the pertinent processor at any desired timing without knowing the program constitution of the whole system.

In the prior art, however, no means is comprised for grasping the programs which are stored in the individual processors and the states in which they are operating. This has sometimes posed a problem in the maintenance and operation of the system.

SUMMARY OF THE INVENTION

The present invention has been made in view of the above circumstances, and has for its object to provide a distributed processing system in which, in order to eliminate the problem of the prior-art distributed processing system as mentioned above and to improve the maintenance and operation efficiencies of the system, when a program constitution in the system has changed due to, e.g., program loading, the change is automatically sensed so as to grasp the program constitution of the whole system, or a distributed processing system and method which can automatically generate information indicative of the relation among programs distributively arranged in individual processors within the system The present invention therefor consists in a system wherein a series of processes are executed with a plurality of programs, characterized in that the relation among the programs according to the stream of the series of processes is recognized using information on the input/output data of each program, or characterized in that each of the processors comprises means to generate information on the program stored in the own processor (a module organization message) and to send the generated module organization message to the other processors.

DETAILED DESCRIPTION OF THE PREFERRED EMBODIMENTS

In the first embodiment of the present invention, each of processors connected to a common transmission line is endowed with a function by which, when a program constitution in the own processor has changed, a message to that effect is sent to the common transmission line, and a function by which, when the message has been received from the common transmission line, information on programs stored in the own processor is broadcast to the common transmission line, and owing to the functions, the messages indicating the program constitutions in the individual processors are automatically broadcast onto the transmission line at the changes of the constitutions of programs, so that a program constitution in a system can be recognized by uniting the messages.

Besides, in the second embodiment of the present invention, information on the input/output data of a program is stored beforehand for each program, and any program is joined with a program which delivers data to be received by the former program, whereby as to a desired program, the execution flow of a series of programs such as a program forming the cause of execution of the desired program and a program forming the cause of execution of the cause program can be recognized. Also, any program is joined with a program which receives data delivered by the former program, whereby as to a desired program, the execution flow of a series of programs such as a program to be executed by the result of execution of the desired program and a program to be executed by the result of execution of the executed program can be recognized.

The foregoing and other objects, advantages, manner of operation and novel features of the present invention will be understood from the following detailed description when read in connection with the accompanying drawings.

[First Embodiment]

Now, the first embodiment of the present invention will be described in detail with reference to the drawings.

First of all, the construction of a distributed processing system to which the first embodiment of the present invention is applied will be described in conjunction with FIGS. 2 and 3.

Figure 2:
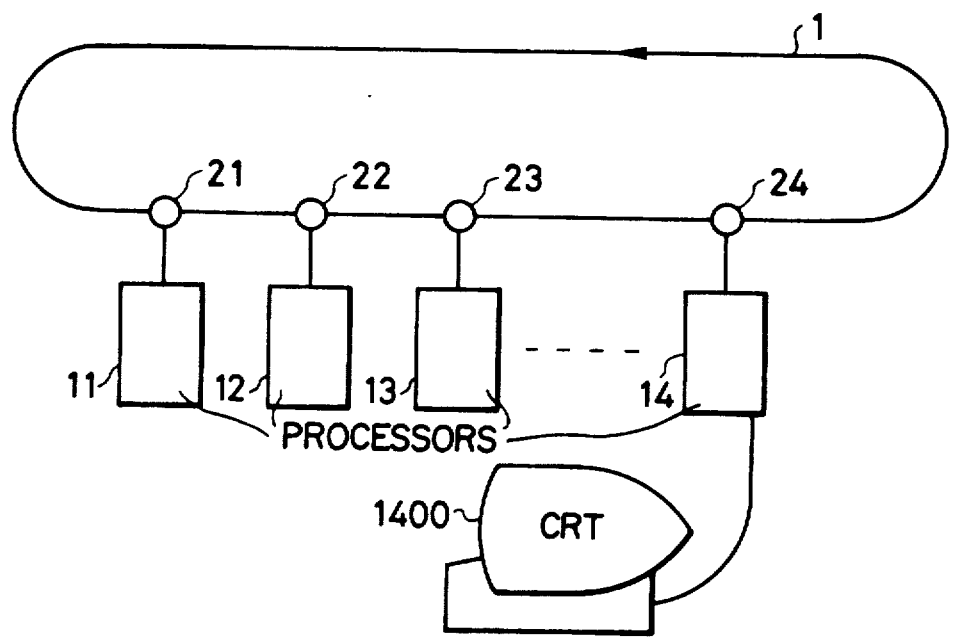
FIG. 2 is a diagram showing an example of construction of a system to which the present invention is applied.

FIG. 2 is a diagram showing the whole arrangement of the system to which the present invention is applied. Although, in examples to be stated below, a common transmission line to which processors are connected will be illustratively shown as only a single loop transmission line, processes are the same even when a general network is used. In the figure, numeral 1 indicates a loop transmission line which is unidirectional in the direction of arrow, numerals 11-14 processors each of which stores application programs in the internal memory thereof and executes them, and numerals 21-24 network control processors (hereinbelow, termed "NCP's") which perform data transmission controls on the transmission line 1.

The respective processors 11-14 and the corresponding NCP's 21-24 are connected bidirectionally, and the processed results (messages) of the processors 11-14 are sent onto the transmission line 1 via the NCP's 21-24.

In addition, each of the NCP's 21-24 has the function of deciding whether or not a message flowing on the transmission line 1 is necessary for the processor connected to the NCP itself, and sending the message decided necessary, to the processor connected thereto. Each of the processors 11-14 starts the application program when all messages required for the execution of the program stored in the processor have become complete. The started program performs its own process by the use of the messages, and produces the result as an output message.

In examples to be explained below, it is assumed that the processor 14 be a processor which recognizes a program constitution and to which a CRT 1400 for presenting the display output of the recognized program constitution is connected.

Figure 3:
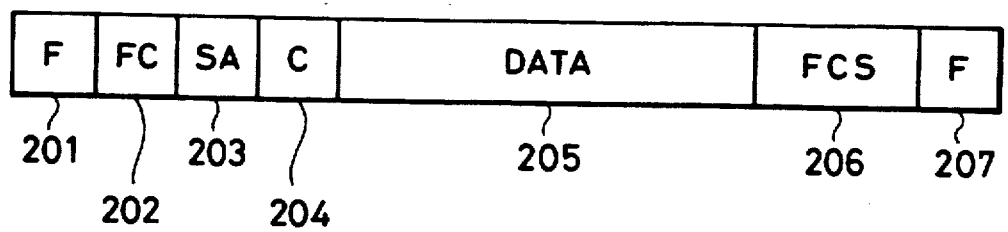
FIG. 3 is a diagram showing the format of a message which is transmitted.

FIG. 3 shows the format of the message which flows on the transmission line 1. In the figure, FC (202) denotes a function code, which is a code corresponding to the content or function of data. On the basis of this function code 202, each NCP decides whether or not the received message is necessary for the processor connected thereto.

SA (203) denotes the address (sender address) of the NCP which has sent the message, while C (204) denotes a consecutive number required for transmission. Data (205) indicates the content of the processed result of each application program. FCS (206) designates error sensing data, and F (201, 207) designate flags which indicate the start and end of the message, respectively.

Figure 1:
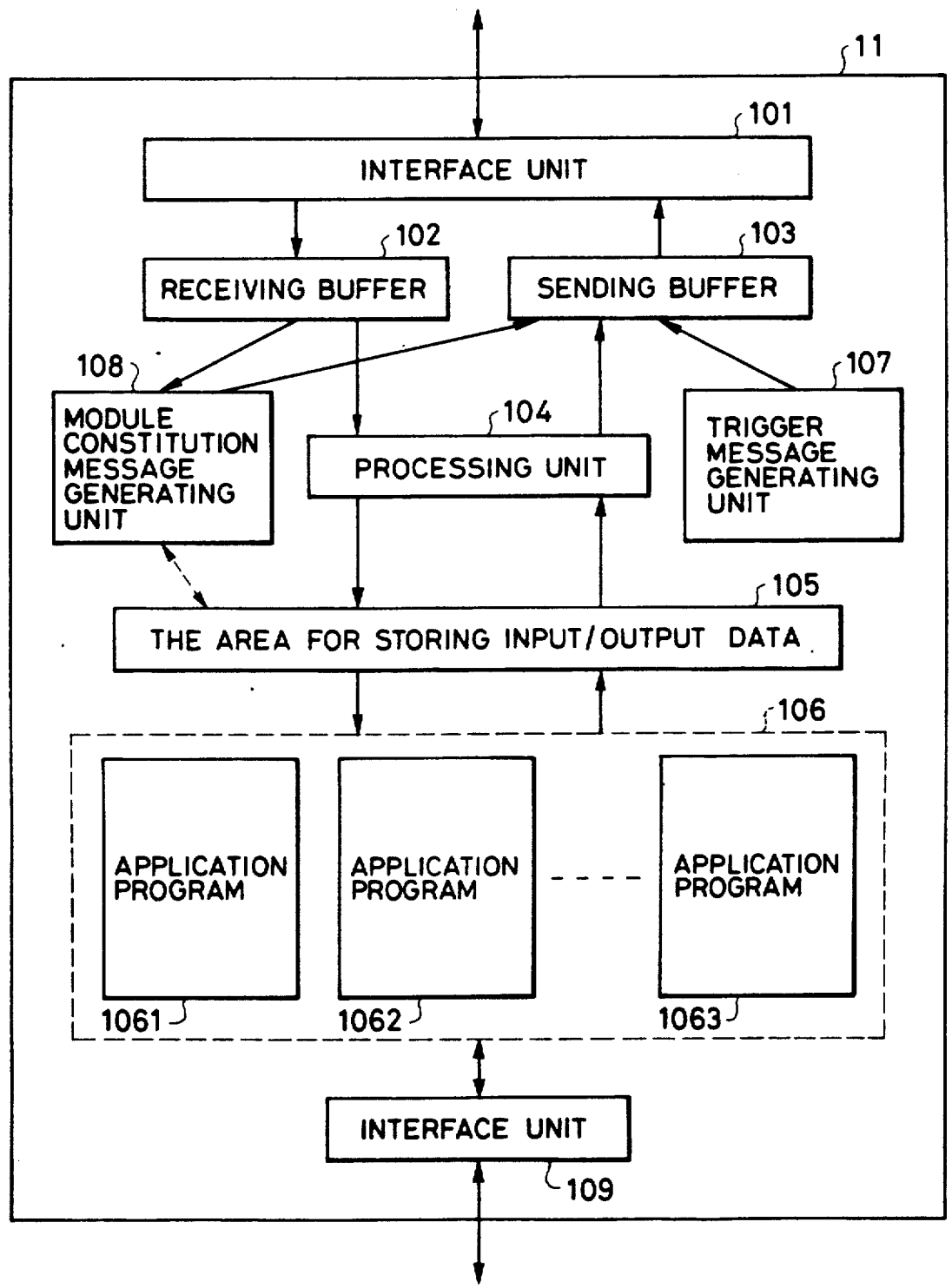
FIG. 1 is a block diagram of a processor showing an embodiment of the present invention.

FIG. 1 is a diagram showing the first embodiment of the present invention, and it illustrates the internal arrangement of the processor 11 shown in FIG. 2. Each of the processors 12-14 has the same arrangement.

Referring to FIG. 1, numeral 101 indicates an interface unit which controls the data transfer between the NCP 21 and the processor 11. It has the function of storing a message received from the NCP 21, in a receiving buffer 102, and the function of delivering a message within a sending buffer 103 to the NCP 21, and simultaneously, storing this message in the receiving buffer 102 when it is necessary for the application program contained in the corresponding processor.

A processing unit 104 is a unit for controlling the execution of the application programs 1061-1063. A trigger message generating unit 107 serves to generate a "trigger message" indicative of the change of a program constitution when the program constitution in the own processor has changed, while a module constitution message generating unit 108 serves to generate a "module constitution message" indicative of information on the application programs stored in the own processor.

An interface unit 109 is a unit for controlling input/output operations from and to an external equipment. In addition, an input/output data storing area 105 is an area for storing the input/output messages of each application program.

Figure 4A:
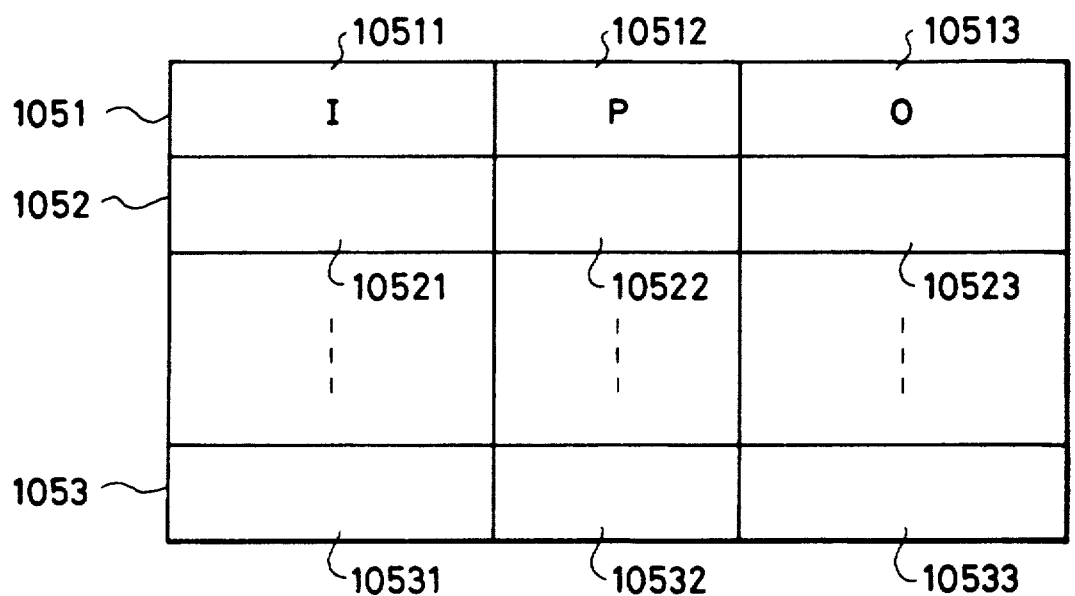
FIGS. 4(a) and 4(b) are diagrams showing table formats.

FIG. 4(a) shows the contents of the input/output data storing area 105. The first line 1051 of the area is an input/output message storing area for the aforementioned application program 1061. In the input/output message storing area 1051, an area 10511 stores an input message (I), and an area 10513 an output message (O). Besides, a start program area 10512 is an area indicative of a program (P: which is the program 1061 here) to be started by the input message stored in the area 10511.

The second line 1052 of the area is an input/output message storing area for the application program 1062. Thenceforth, an input/output message storing area is set every application program in similar fashion.

Figure 4B:
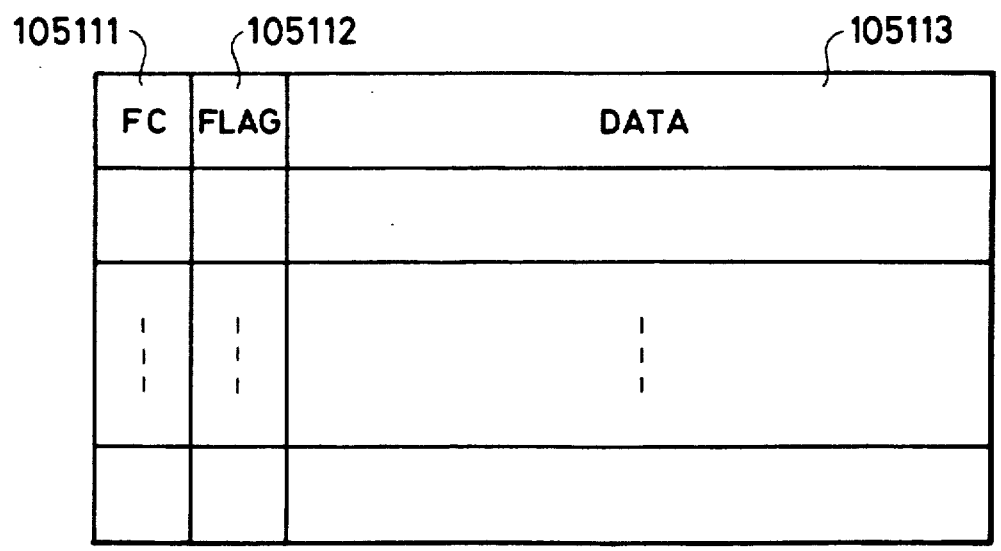

FIG. 4(b) is a diagram showing the format of the input message storing area 10511 included in the input/output message storing area 1051. In an area 105111, the function code of the input message is set beforehand. An area 105112 is an area for setting a flag which indicates whether or not the input message is stored, while an area 105113 is an area for storing the content of a data part within the message.

In a case where the application program is started by a plurality of input messages of different function codes, the areas 105111-105113 are set every message. By the way, the output message storing area 10513 has the same format.

Figure 5A:
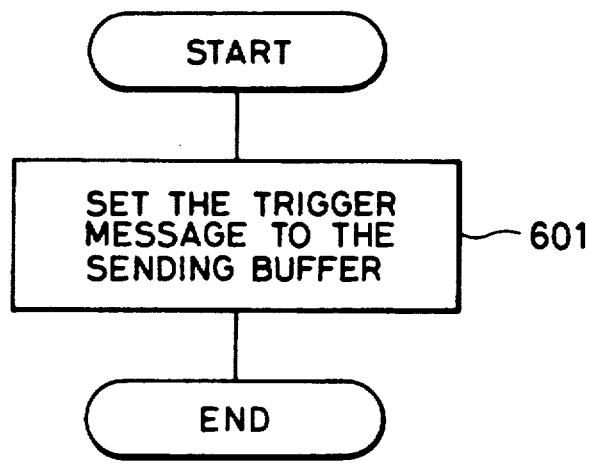
FIG. 5(a), FIG. 6(a), and FIGS. 9(a) and 9(b) are processing flow charts of embodiments.

FIG. 5(a) is a chart showing the processing flow of the trigger message generating unit 107. This unit 107 is started when the own processor is to be started or when the constitution of the application programs stored in the own processor has changed due to the addition, deletion or the like of an application program. Then, it sets in the sending buffer 103 a function code (FCa) specifying the trigger message and own processor No. (PNO) as the content of a data part.

Figure 5B:
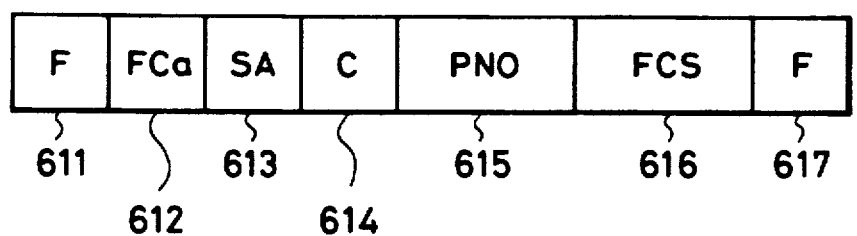
FIG. 5(b), and FIGS. 6(b) and 6(c) are diagrams showing the formats of messages which are generated.

The interface unit 101 arranges the contents of the sending buffer 103 into the message format shown in FIG. 3 before, and then delivers them to the common transmission line 1. The format of the message on this occasion is shown in FIG. 5(b). Parts 611-617 correspond to the parts 201-207 in FIG. 3, respectively. The function code (FCa) specifying the trigger message is set in the FC part 612, and the processor No. (PNO) in the data part 615.

Figure 6A:
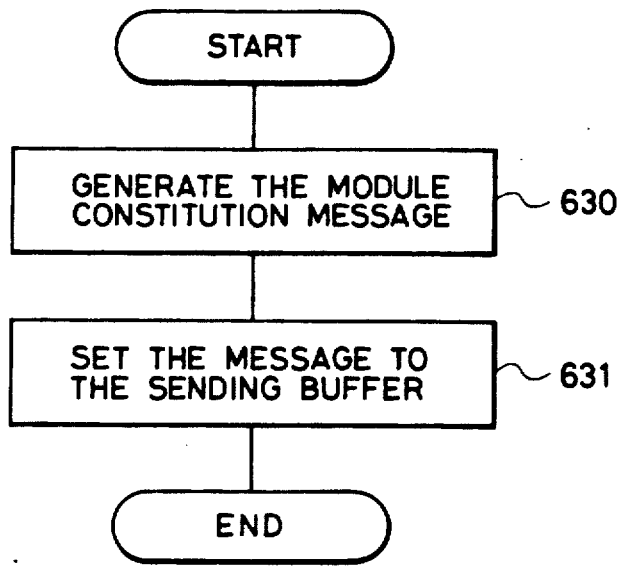

FIG. 6(a) is a chart showing the processing flow of the module constitution message generating unit 108. This unit 108 is started when the trigger message has been received. Incidentally, it is assumed that, in the NCP connected to the corresponding processor, the function code (FCa) indicative of the trigger message be previously registered as the function code of a message required by the own processor. First, the module constitution message generating unit 108 generates information on the application programs stored in the own processor, namely, the data part of the module constitution message by reference to the content of the input/output data storing area 105 (step 630). Subsequently, it sets in the sending buffer 103 the content generated by the step 630 and a function code (FCb) specifying the module constitution message (step 631).

Figure 6B:
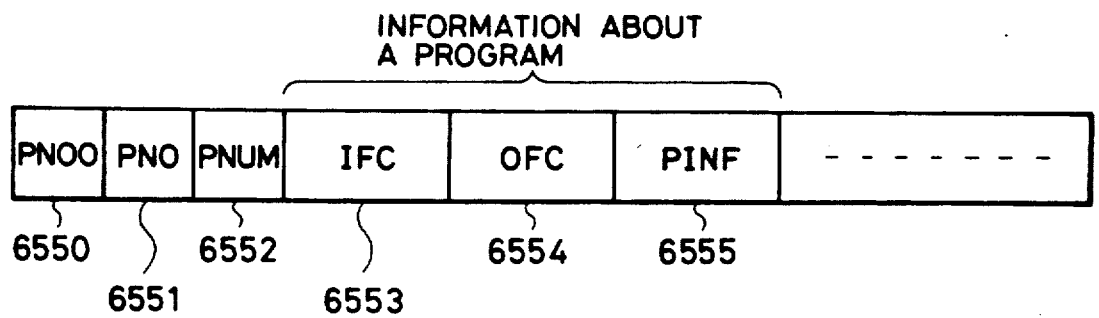

FIG. 6(b) shows the contents of the data part of the module constitution message generated by the step 630. PNOO 6550 indicates an area in the trigger message data part for storing processor No., PNO 6551 indicates own processor No., and PNUM 6552 indicates the number of application programs stored in the own processor. In addition, numerals 6553-6555 indicate areas which are set for each application program, and the areas IFC 6553 and OFC 6554 store the function code of an input message required by the pertinent application program and the function code of a message to be delivered by the program, respectively.

In these areas, the function codes set in the input message storing area (I) and output message storing area (O) of the input/output data storing area 105 are respectively set. Besides, in the area PINF 6555, the content of the start program area (P) of the input/output data storing area 105 is set. The interface unit 101 arranges the contents of the sending buffer 103 into the message format shown in FIG. 3, and then delivers them to the common transmission line 1.

Figure 6C:
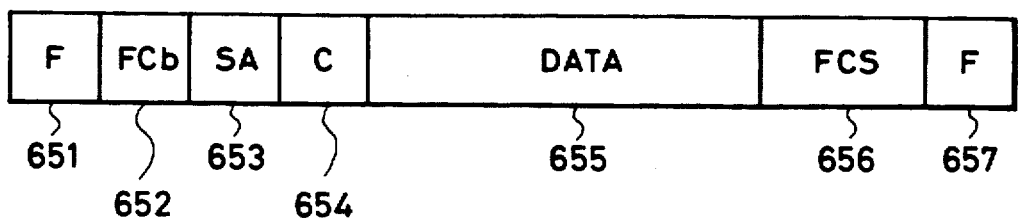

FIG. 6(c) is a diagram showing the contents of this message. Parts 651-657 correspond to the parts 201-207 shown in FIG. 3 before, respectively. The function code (FCb) specifying the module constitution message is set in the FC part 652, and the contents shown in FIG. 6(b) are set in the data part 655.

According to the above embodiment, in a distributed processing system, the constitution of programs in each of processors distributively arranged can be recognized, and when the program constitution has changed, the change can be detected to renew the recognized constitution, so that the newest program constitution can be recognized at all times.

Next, processes for recognizing the program constitution in the system by the use of the module constitution message shown in FIG. 6(c) will be described with reference to FIG. 7-FIG. 9(b).

Figure 7:
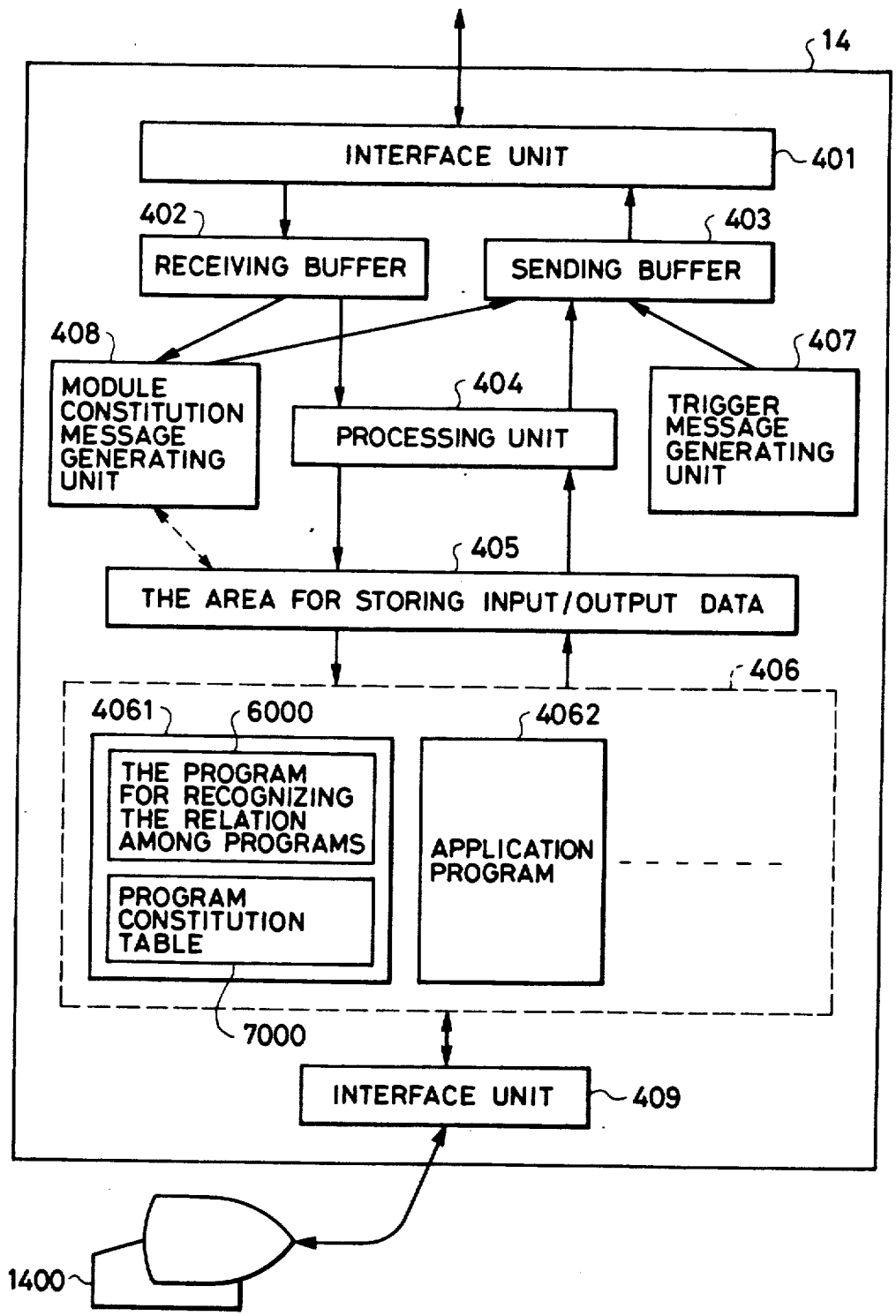
FIG. 7 is a block diagram of a processor showing another embodiment.

FIG. 7 is a diagram showing a processor for recognizing the program constitution in a modified embodiment of the present invention, and it illustrates the internal arrangement of the processor 14 shown in FIG. 2.

This processor 14 is generally identical in arrangement to the processor 11 shown in FIG. 1 before, and portions 401-409 correspond respectively to the portions 101-109 of the processor 11 depicted in FIG. 1. The points of difference between both the processors are that the CRT console 1400 is connected to the interface unit 409, and that a program 4061 for recognizing the program constitution in the system is stored as an application program.

Figure 8:
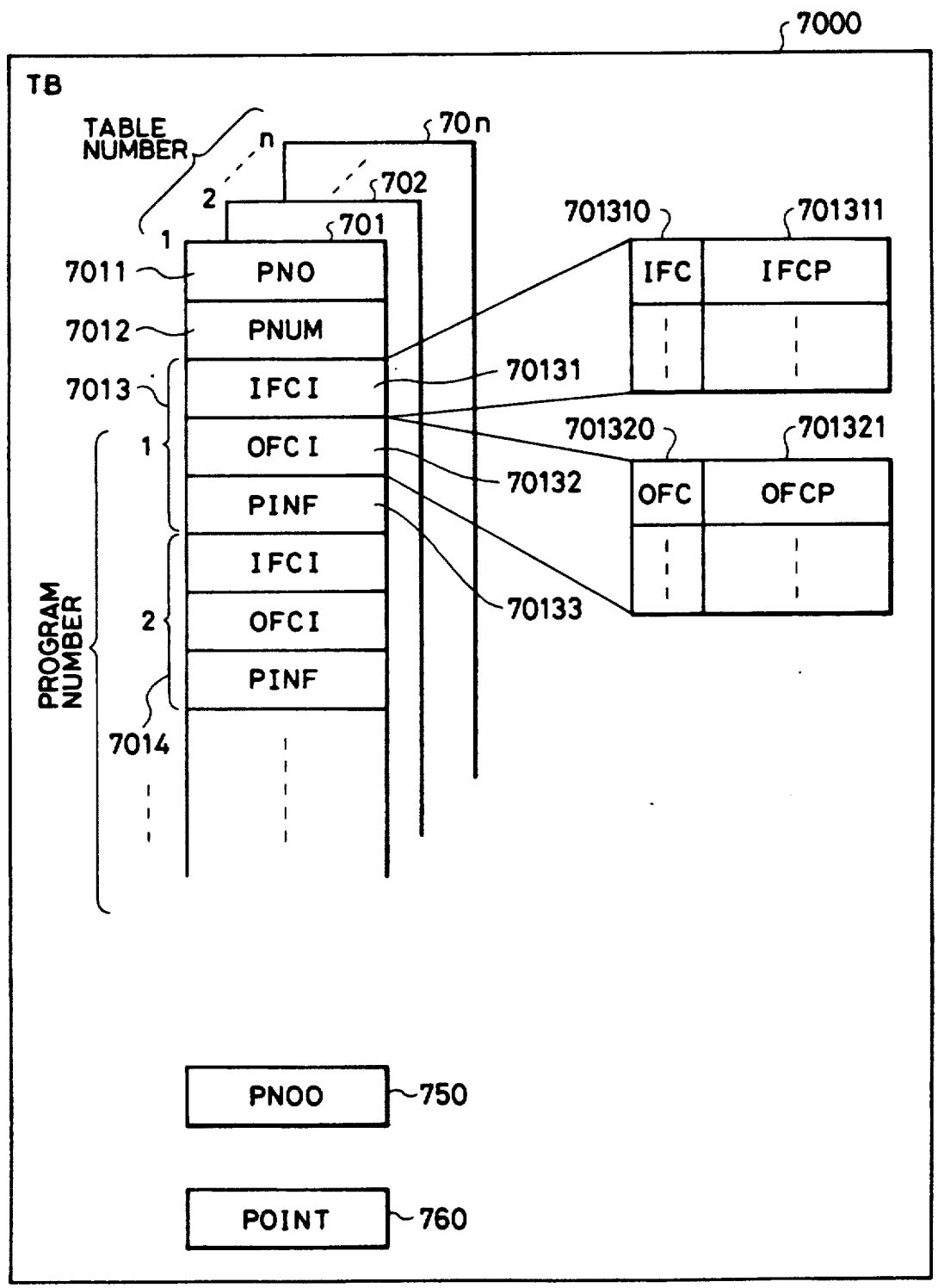
FIG. 8 is a diagram showing a table format.

The program 4061 for recognizing the relation among the programs in the system consists of a program area 6000 storing actual processing steps, and a program constitution table area 7000 for storing the program constitution. FIG. 8 shows the format of the program constitution table area 7000. This table lists application programs stored in the respective processors, and the input/output relations among the application programs.

The program constitution table (TB) is made up of tables for the respective processors (processor tables) 701-70n, and a trigger processor No. storing area 750 as well as a processor number storing area 760. The processor tables 701-70n are identified by serial Nos. (table Nos.) respectively assigned thereto.

While the format of the table 701 will now be explained, each of the tables 702-70n has the same format. The table 701 is composed of an area PNO (7011) for storing processor No., an area PNUM (7012) for storing the number of application programs in the processor, and areas (7013, 7014, . . .) for storing information items on the respective programs. These program information areas 7013, 7014, . . . are identified by serial Nos. (program Nos.) assigned to the respective areas.

The area 7013 corresponding to program No. 1 consists of an input data information part IFCI (70131), an output data information part OFCI (70132), and a program information part PINF (70133). The areas 7014 et seq. corresponding to programs No. 2 et seq. are similarly constructed. The input data information part IFCI (70131) consists of input function codes IFC (701310), and upstream program pointers IFCP (701311). The upstream program pointer IFCP (701311) indicates the position within the module constitution table, of the application program which delivers a message having the input function code IFC (701310).

In addition, the output data information part OFCI (70132) consists of output function codes OFC (701320) and downstream program pointers OFCP (701321). The downstream program pointer OFCP (701321) indicates the position within the module constitution table, of the application program which receives a message having the output function code OFC (701320). By the way, a value not coincident with processor No., for example, (−1) is set as an initial value in the trigger processor No. area 750 beforehand. Besides, the processor number area 760 is an area which indicates the number of processors recorded in the module constitution table.

Next, the processing contents of the program for generating the above-stated module constitution table and presenting the contents thereof as display outputs, i.e., the program 6000 shown in FIG. 7 before, will be described with reference to FIGS. 9(a) and 9(b).

Figure 9A:
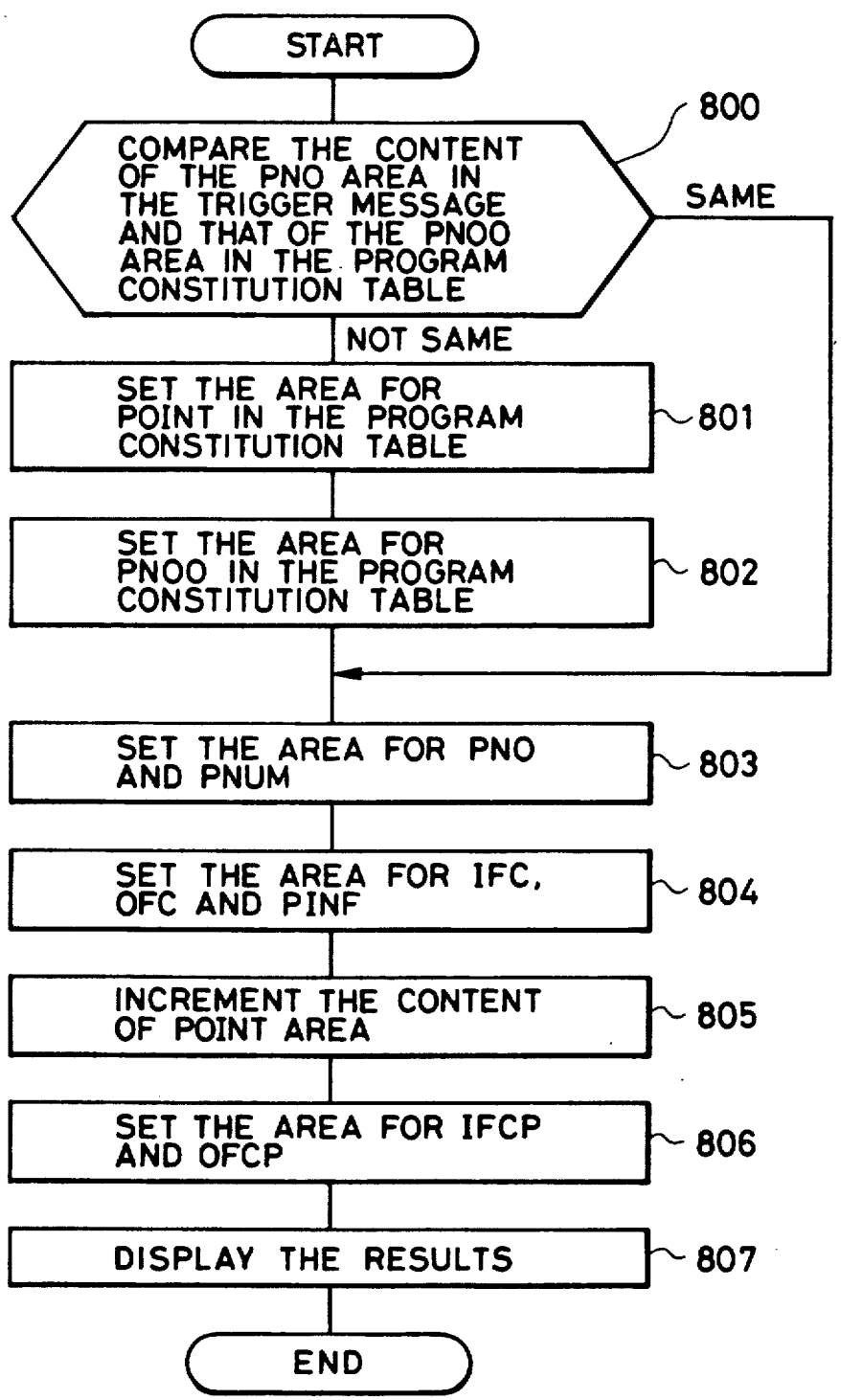
Figure 9B:
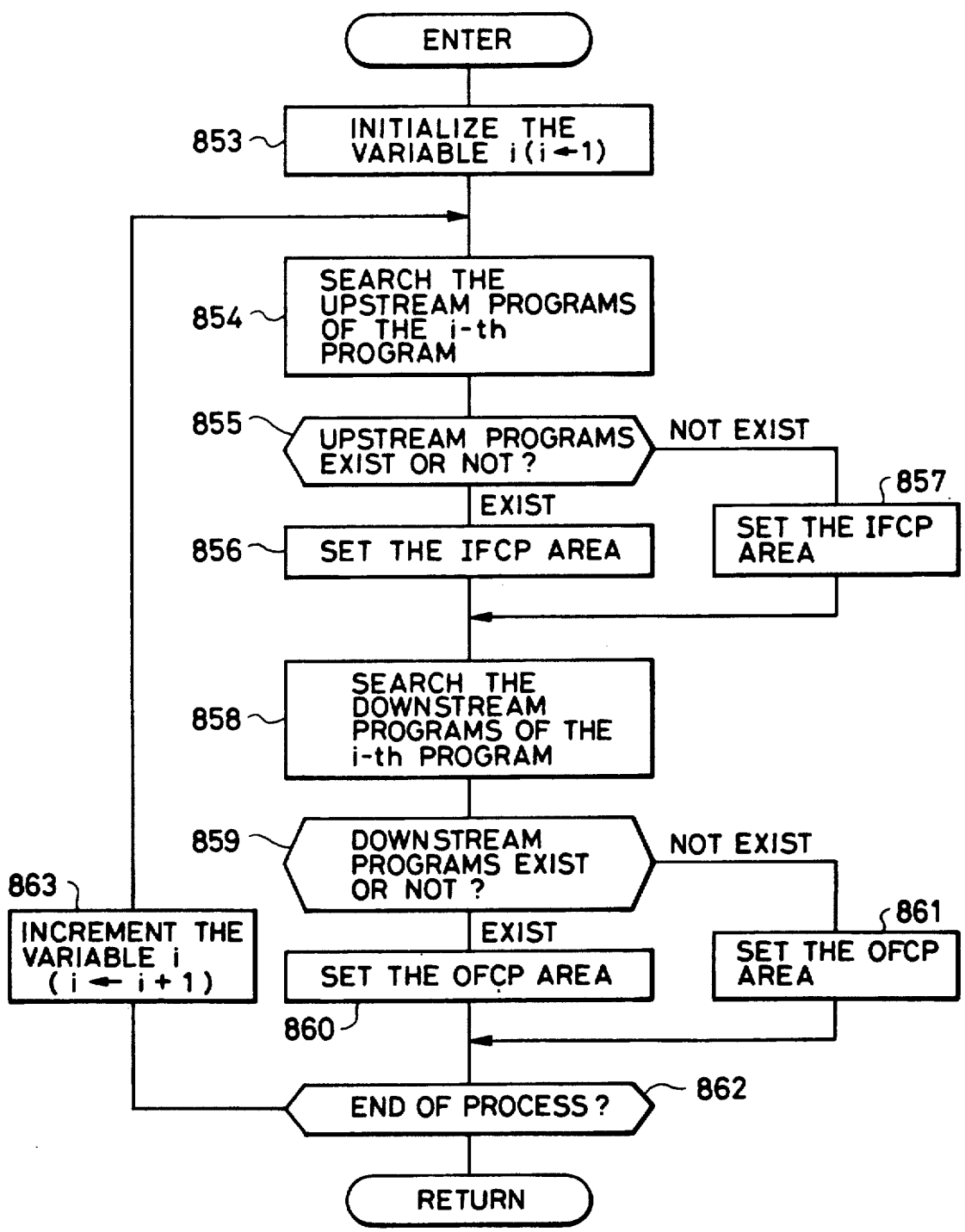

FIG. 9(a) is a chart showing the processing flow of the whole program. This program is started when the module constitution information message has been received. The started program first compares the content of the trigger processor No. area (refer to 6550 in FIG. 6(b)) in the input message with that of the trigger processor No. area 750 in the program constitution table (step 800). In a case where both the contents do not agree, "1" is set in the processor number area 760 in the program constitution table (step 801).

Subsequently, the trigger processor No. in the input message is set in the trigger processor No. area 750 (step 802), whereupon the flow shifts to a step 803. Meanwhile, in a case where in the comparison of the step 800, the trigger processor No. in the input message agrees with the trigger processor No. in the program constitution table, the step 800 is directly followed by the step 803.

At the step 803, the processor No. (PNO) and program number (PNUM) in the POINT (760)-th processor table are set according to the contents of the input message. Next, according to the contents of the input message, the IFC in the input data information part IFCI (70131) of the POINT-th processor table, the OFC in the output data information part OFCI (70132) thereof and the program information part PINF (70133) thereof are set for each of the programs (step 804).

Thereafter, the content of the processor number area is incremented by "1" (step 805). After the end of the above processing steps, the upstream pointers IFCP and downstream pointers OFCP of the respective programs in the first to (POINT 1)-th processor tables are set (step 806). Now, the pointer setting process will be described with reference to FIG. 9(b).

This process is performed for each of the first to (POINT 1)-th processor tables. Here, the processor table 701 shown in FIG. 8 will be described by way of example. First, a counter i for this process is initialized ("1" is set) (step 853). Secondly, programs each of which delivers a message having a function code that is set in the IFC (701310) of the input data information part IFCI (70131) of the area 7013 for the i-th (herein, first) program information are searched for in the processor table (step 854).

In the absence of the program to be delivered, a value (for example, −1) indicative of 'no program' is set in the upstream program pointer IFCP (701311) of the input data information part IFCI (70131) (step 857). In the presence of the program to be delivered, the table No. of the processor table with the particular program recorded therein and the program No. indicative of the position of the program within the table are set in the upstream program pointer IFCP (701311) of the input data information part IFCI (70131) (step 856).

At the next step 858, likewise to the foregoing case, programs each of which receives a message having a function code that is set in the OFC (701320) of the output data information part OFCI (70132) of the area 7013 for the i-th (herein, first) program information are searched for in the processor table. In the absence of the program to be received, as at the step 857, the value indicative of 'no program' is set in the downstream program pointer OFCP (701321) of the output data information part OFCI (70132) (step 861).

In the presence of the program to be received, as at the step 856, the table No. of the processor table with the particular program recorded therein and the program No. are set in the downstream program pointer OFCP (701321) of the output data information part OFCI (70132) (step 860).

After the end of the above processing steps, whether or not the value of the counter i agrees with the program number PNUM (7012) in the processor table is decided (step 862). In case of disagreement, the value of the counter i is incremented by "1" (step 863) to shift to the step 854. That is, the steps 854–861 are repeated the times of the number of the programs recorded in the processor table. After the processes shown in FIG. 9(b) have been performed for the first - (POINT 1)-th processor tables, the flow shifts to a step 807 in FIG. 9(a), at which the contents of the tables are displayed as outputs on the CRT 1400.

On this occasion, each program which has the value indicative of 'no program' set in the upstream program pointer IFCP (701311) or downstream program pointer OFCP (701321) within the processor table is a program as to which the input message is not generated or no program uses the output message. Therefore, such a program is displayed as an output with information which indicates that the program is not completed in the program constitution yet.

According to the modified embodiment stated above, in a distributed processing system, the constitution of programs in each of processors distributively arranged can be recognized at the whole system level, and when the program constitution has changed, the change can be detected to renew the recognized constitution so that the newest program constitution can be recognized at all times. Moreover, programs which are not completed in the program constitution can be detected In the above embodiment, the processor 14 is used as the processor which sets the programs for recognizing the program constitution Needless to say, however, this is not restrictive, but arbitrary numbers of programs for recognizing the program constitution can be set in any desired processors.

By setting means to generate a trigger message in response to a key-in operation as has hitherto been employed, the program constitution in the system on each occasion can be recognized by the request of an operator.

As described above, according to the first embodiment of the present invention, a distributed processing system wherein the series of processes of one task are distributively executed by a plurality of processors connected to a common transmission line is so constructed that each of the processors comprises apparatus to generate the module constitution message stated before, stored in the own processor, and apparatus to broadcast onto the common transmission line the module constitution message generated by the first-mentioned apparatus means. Therefore, the invention achieves the remarkable effect that a distributed processing system capable of enhancing the maintenance and operation efficiencies thereof can be realized. Besides, in a case where the system is constructed so as to comprise, in addition to the aforementioned apparatus, apparatus to gather the module constitution messages and to recognize a program constitution in the system by the use of them, the invention is effective to realize a distributed processing system in which the constitution of application programs arranged in each of the processors can be grasped at the whole system level, and in which when the program constitution has changed, the change can be immediately detected to renew the program constitution grasped.

[Second Embodiment]

Next, the second embodiment of the present invention will be described in detail with reference to the drawings.

Figure 11:
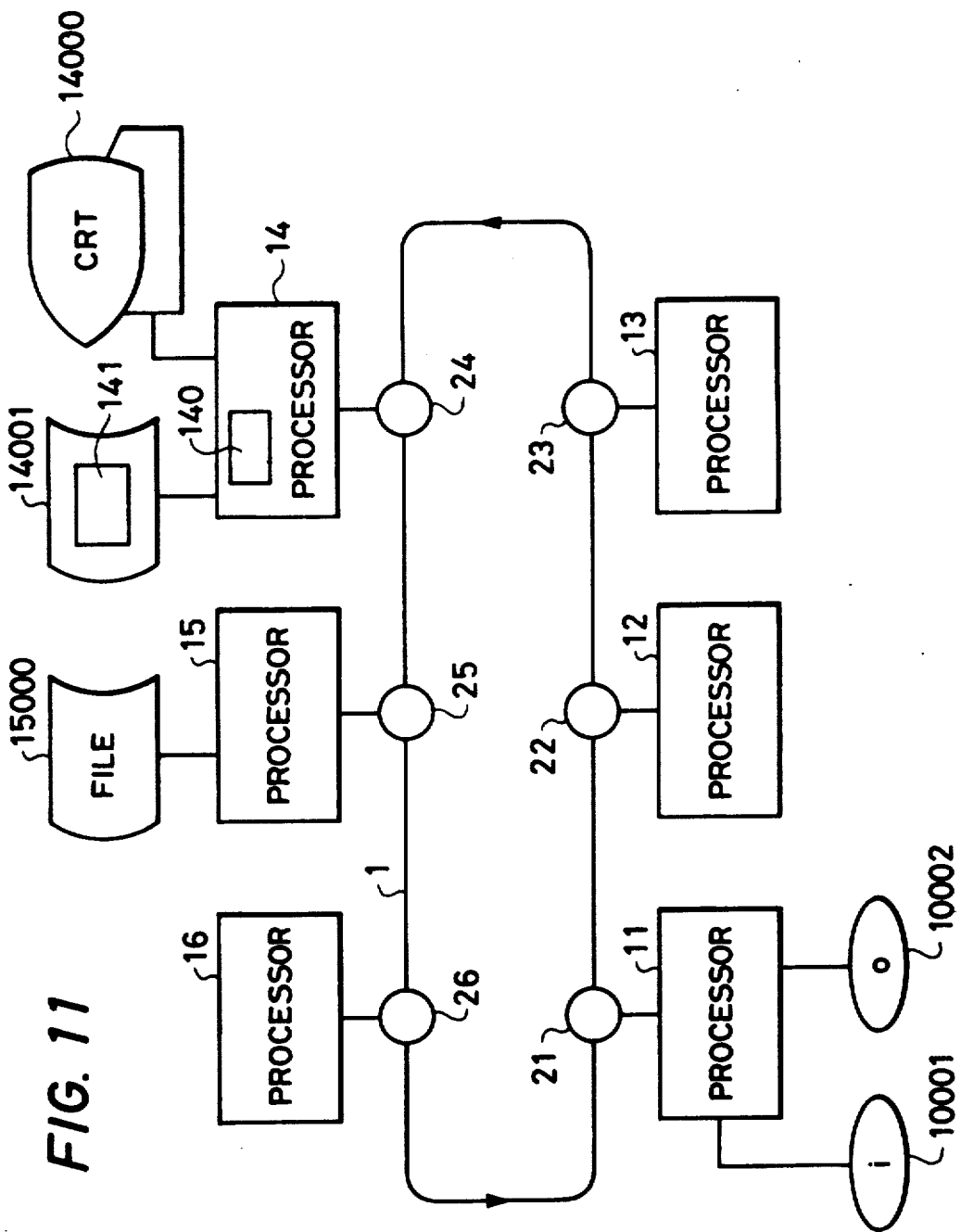
FIG. 11 is a diagram showing an example of construction of a system to which the present invention is applied.

FIG. 11 is a diagram showing the whole arrangement of a system to which the method of the second embodiment of the present invention for recognizing the relation among software modules is applied. Although, in examples to be stated below, a common transmission line to which processors are connected will be illustratively shown as only a single loop transmission line, processes are the same even when a general network is used. In the figure, numeral 1 indicates a loop transmission line which is unidirectional in the direction of arrow, numerals 11-16 processors each of which stores application programs in the internal memory thereof and executes them, and numerals 21-26 network control processors (hereinbelow, termed "NCP's") which perform data transmission controls on the transmission line 1.

The respective processors 11-16 and the corresponding NCP's 21-26 are connected bidirectionally, and the processed results (data) of the processors 11-16 are sent onto the transmission line 1 via the NCP's 21-26.

Each of the NCP's 21-26 has the function of deciding whether or not data flowing on the transmission line 1 is necessary for the processor connected to the NCP itself, and sending the data to the connected processor only when it is decided necessary. Each of the processors 11-16 starts the application program when all data required for the execution of the program stored in the processor have become complete. The started program performs its own process by the use of the data items, and produces the result as an output.

In the second embodiment to be explained below, a program 140 for the method of the present invention for recognizing the relation among programs is set in the processor 14, to which a CRT 14000 for presenting a recognized result as a display output and a file 14001 for storing a table indicative of a program constitution to be described later are connected.

In addition, the processor 11 has an external input unit 10001 and an external output unit 10002 connected thereto, and it is constructed so as to gather data from an external process through the external input device 10001 and to deliver data to an external process through the external output device 10002. Besides, a file 15000 is connected to the processor 15.

Figure 12:
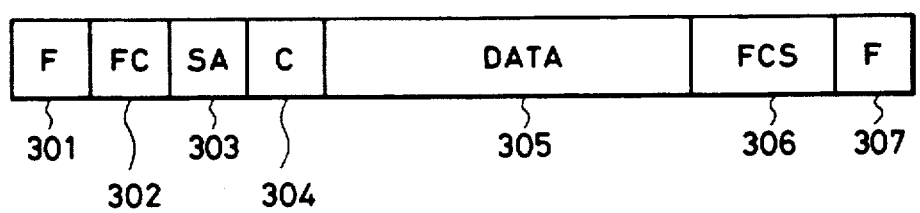
FIG. 12 is a diagram showing the format of a message which is transmitted.

FIG. 12 shows the format of a message which flows on the transmission line 1. In the figure, FC (302) denotes a function code, which is a code corresponding to the content or function of the message. On the basis of this function code 302, each NCP decides whether or not the received message is necessary for the processor connected thereto.

SA (303) denotes the address (sender address) of the NCP which has sent the message, while C (304) denotes a consecutive number required for transmission. Data (305) indicates the content of the processed result of each application program. FCS (306) designates error sensing data, and F (301, 307) designate flags which indicate the start and end of the message, respectively.

Figure 13A:
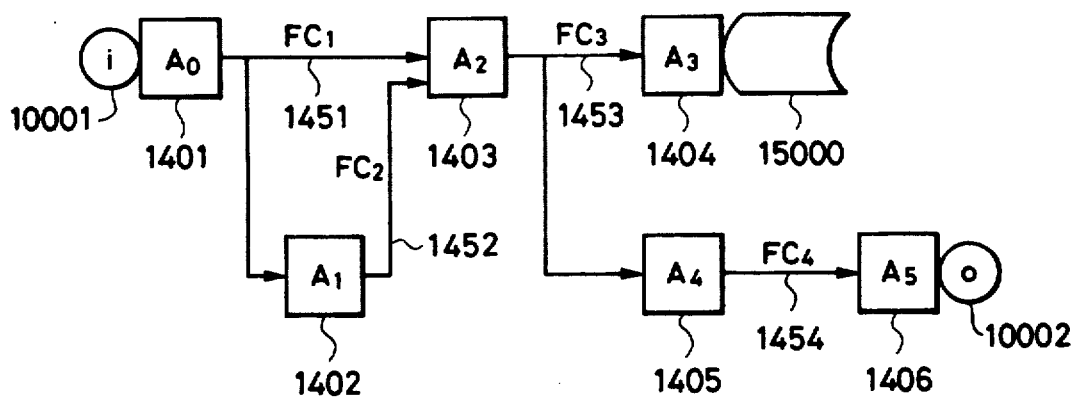
FIG. 13(a) and 13(b) are diagrams showing examples of application programs which are set in the system shown in FIG. 11.
Figure 13B:
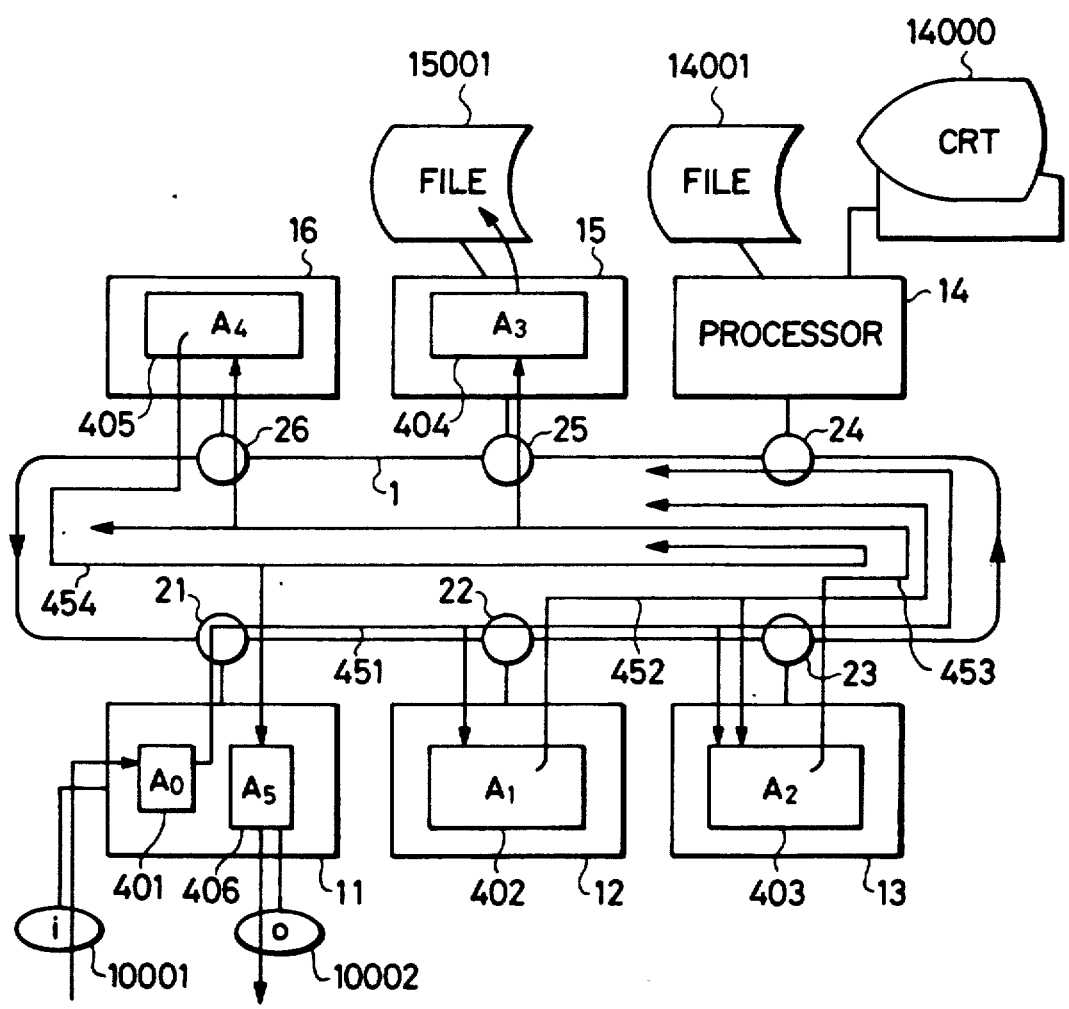

FIGS. 13(a) and 13(b) exemplify the application programs which are set in the present system. First FIG. 13(a) schematically illustrates the relation among programs. Program $A_0$ (1401) having gathered data from the external input unit 10001 (i) delivers a message 1451 having a function code $FC_1$, and this message becomes the input messages of programs $A_1$ (1402) and $A_2$ (1403).

The program $A_1$ (1402) performs a process in accordance with the content of the input message 1451, and produces a message 1452 having a function code $FC_2$ as the processed result. The program $A_2$ (1403) performs a process with the messages 1451 and 1452, and produces a message 1453 having a function code $FC_3$ as the processed result. This message 1453 becomes the input messages of programs $A_3$ (1404) and $A_4$ (1405).

The program $A_3$ (1404) edits the input message 1453, and thereafter stores the edited message in the file 15000 of its own. On the other hand, the program $A_4$ (1405) performs a process with the message 1453, and it produces a message 1454 having a function code $FC_4$ as the processed result. This message 1454 is received by program $A_5$ (1406), and is externally delivered through the external output unit 10002 (o).

FIG. 13(b) shows the actual flows of the messages in the system having the above program constitution. Here, the programs $A_0$ and $A_5$ are set in the processor 11 shown in FIG. 11, and the programs $A_1$, $A_2$, $A_3$ and $A_4$ are respectively set in the processors 12, 13, 15 and 16.

Now, using the program constitution shown in FIGS. 13(a) and 13(b) as a concrete example, the operation of the present embodiment will be described in conjunction with FIGS. 14(a) and 14(b), FIGS. 15(a) and 15(b), and FIG. 10.

Figure 14A:
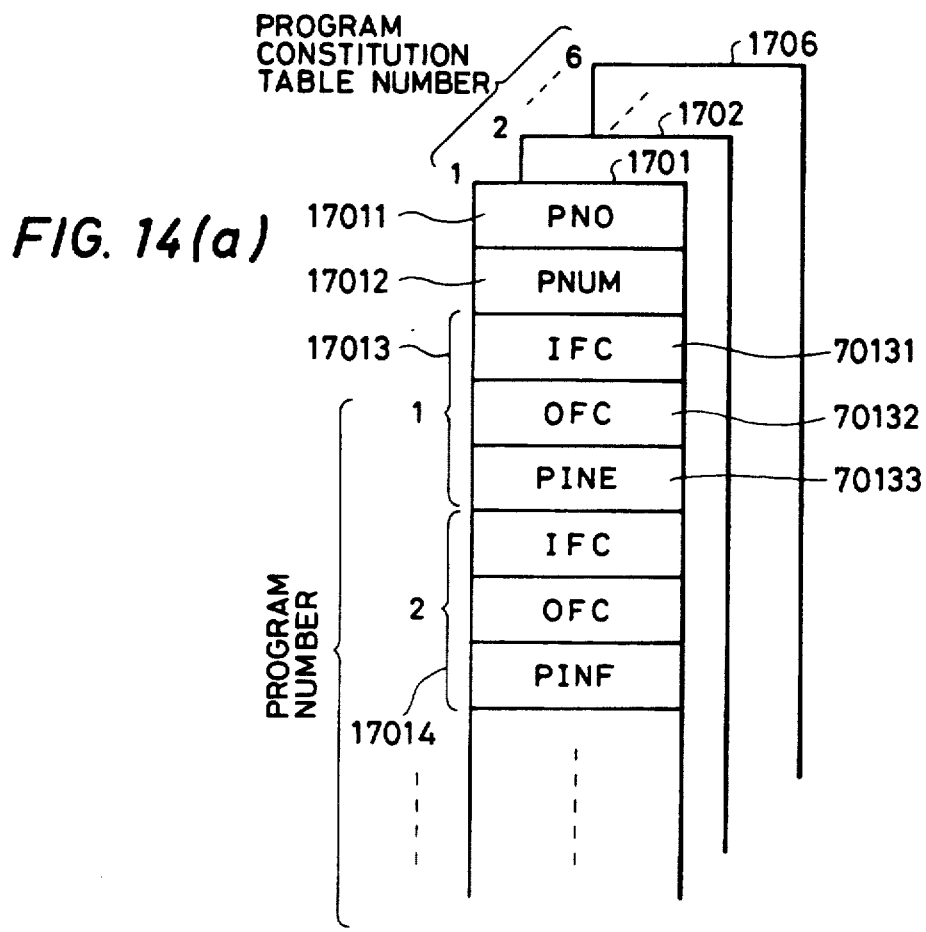
FIGS. 14(a) and 14(b) are diagrams showing table formats for use in the present invention.
Figure 14B:
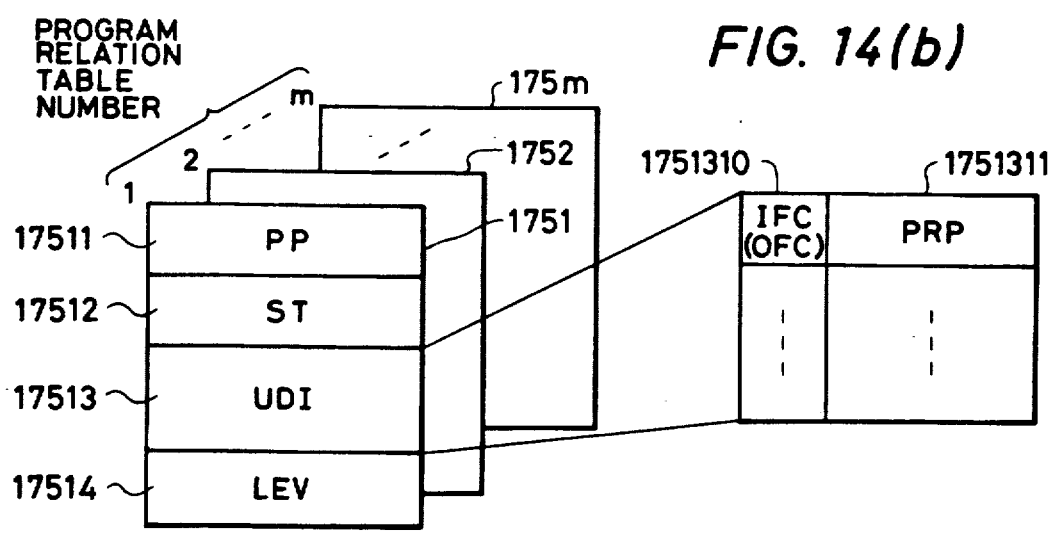

First, the formats of tables for use in the present embodiment are shown in FIGS. 14(a) and 14(b). FIG. 14(a) illustrates a table 141 indicative of the program constitution in the system, which is set in the file designated by numeral 14001 in FIG. 11, and this table shall be called the "program constitution table" hereinafter. This table 141 is constructed of tables 1701-1706 corresponding to the respective processors 11-16, and these tables are identified by serial Nos. (program constitution table Nos.) respectively assigned thereto.

While the format of the table 1701 will now be explained, each of the tables 1702-1706 has the same format. The table 1701 is composed of an area PNO (17011) for storing processor No. allotted to the processor 11, an area PNUM (17012) for storing the number of programs stored in the processor 11, and areas (17013, 17014, . . .) for storing information items on the respective programs. The area 17013 consists of an area IFC (170131) for storing the function code of a message to become the input of the program, an area OFC (170132) for storing the function code of a message to become the output of the program, and an area PINF (170133) for storing the attribute of the program, for example, a program identifier.

The areas 17014, 17015, . . . are similarly constructed.

It is assumed that the contents of the table be previously set before the performance of the method of the present embodiment. The setting of the table can be achieved by, for example, an expedient in which each of the processors is endowed with the function of sending program information in its own processor, whereupon the processor 14 gathers the information items of the respective processors.

FIG. 14(b) illustrates a table indicative of the relation among programs (hereinbelow, termed the "program relation table"), and the table is generated by the program 140 in the processor 14 shown in FIG. 11 in accordance with the method of the present invention. This table is generated in a RAM area within the processor 14.

The program relation table is constructed of tables 1751-175m corresponding to the respective programs, and these tables are identified by serial Nos. (program relation table Nos.) respectively assigned thereto.

While the format of the table 1751 will now be explained, each of the tables 1752-175m has the same format. The table 1751 is composed of a program pointer area PP (17511), a table status area ST (17512), an upstream/downstream information part UDI (17513) and a level area LEV (17514). The program pointer area PP (17511) is an area which stores a pointer indicative of the position of the program corresponding to this table, within the program constitution table (refer to FIG. 14(a)), and in which program constitution table No. and program No. are set. The table status area ST (17512) is an area for setting information which indicates whether this table is in a normal state or a connecting state.

In the upstream/downstream information part UDI (17513), there is stored the information of a program which lies upstream or downstream as viewed on the message flow of the program corresponding to this table. In a case where the information to be stored is upstream information, it is composed of an area (IFC 1751310) for the input FC of the program corresponding to this table, and an area (PRP 1751311) for a pointer indicative of the position within the program relation table, of the program which delivers a message having the FC. Concretely, the pointer PRP (1751311) is the program relation table No. of the program relation table shown in FIG. 14(b).

On the other hand, in a case where the information to be stored is downstream information, an output FC (OFC) is set in the area 1751310 instead of the input FC (IFC), and a pointer indicative of the position within the program relation table, of the program which receives a message having the OFC is set in the area 1751311.

Figure 15A:
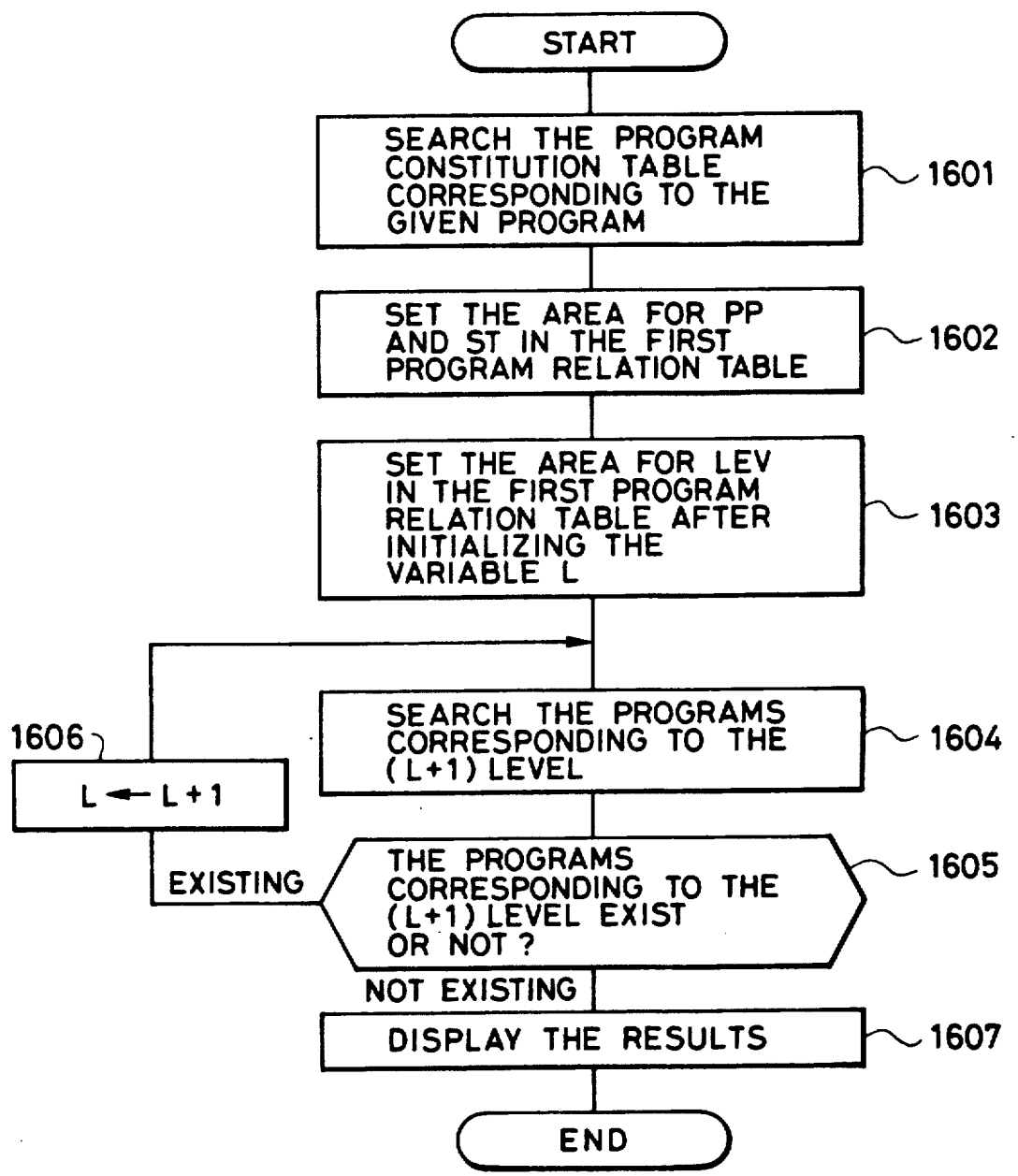
FIGS. 15(a) and 15(b) are processing flow charts in embodiments.
Figure 15B:
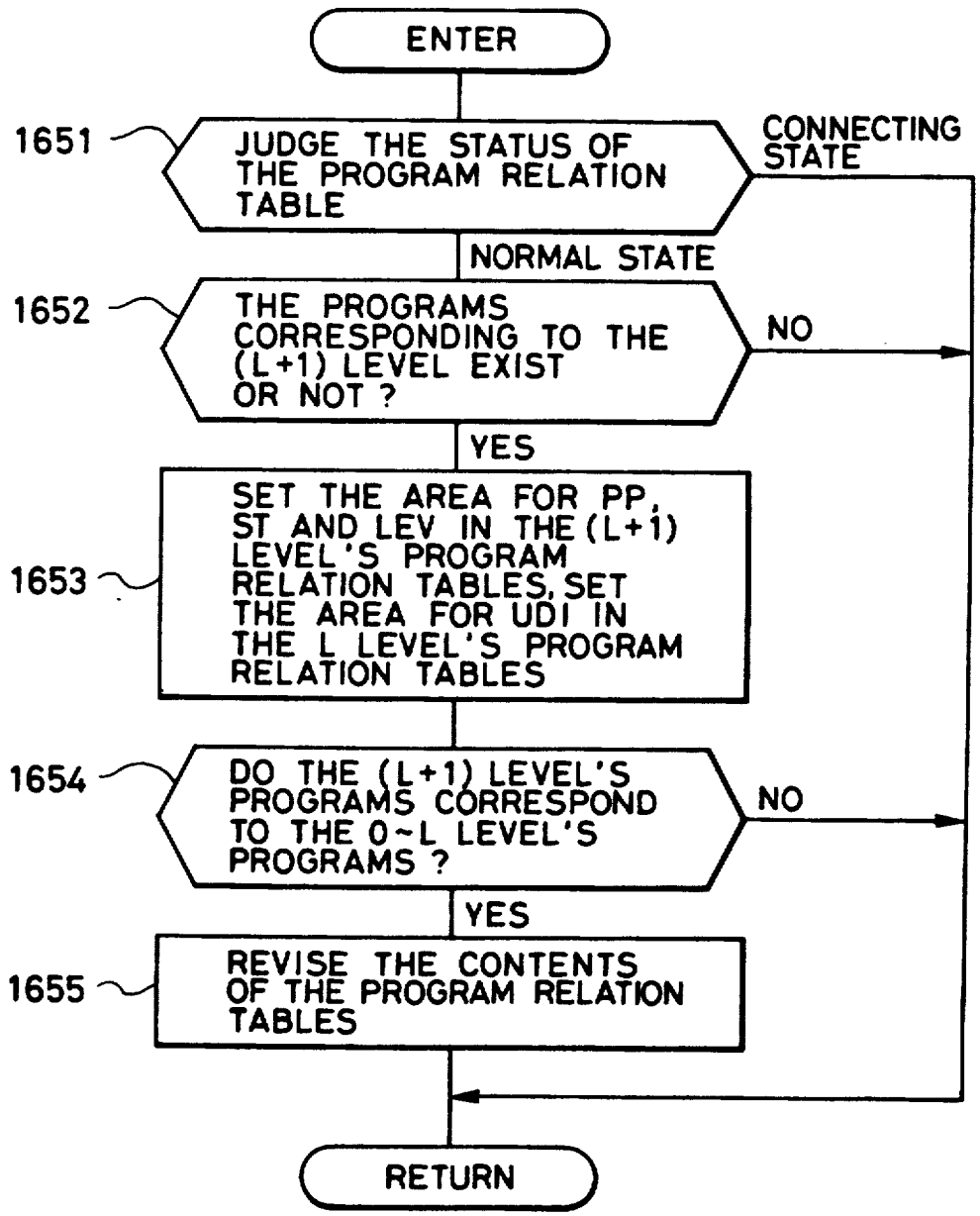

FIGS. 15(a) and 15(b) are charts showing the processing flow of the program 140 within the processor 14 depicted in FIG. 11. This program 140 is started in such a way that an operator keys in on the CRT 14000 connected to the processor 14. Here, information items to be keyed in are information designating a program (for example, the program identifier and processor No.) and information indicating the upstream relation or the downstream relation. The program 140 retrieves a program lying upstream or downstream of the program designated by the operator, from within the program constitution table shown in FIG. 14(a), and displays the retrieved program on the CRT 14000 as an output.

Next, the processes of the program 140 will be described with reference to FIGS. 15(a) and 15(b) and FIG. 10.

It is now assumed that the program $A_0$ (401) shown in FIG. 13(a) be designated by the operator and that a program lying downstream on the message flow thereof be retrieved. First, the program 140 searches for the position within the program constitution table, of the program corresponding to the information received from the CRT 14000, namely, program constitution table No. and program No. (step 1601) and sets them in the program pointer area PP (17511) of the first program relation table 1751. Also, it sets the information of the normal state in the table status area ST (17512) (step 1602).

Subsequently, "0" is set as a variable (level variable) L indicative of a level, and "0" is also set in the level area LEV (17514) of the program relation table (step 1603). Here, the expression "level" signifies a pointer which is incremented in such a manner that "0" is set for the program designated by the operator, that "1" is set for a program one stage upstream or downstream, and that "2" is set for a program still one stage upstream or downstream.

Subsequently, the processing flow shifts to a process (step 1604) for searching for a program which receives the output message (1451 in FIGS. 13(a) and 13(b)) of the program $A_0$ (1401 in FIGS. 13(a) and 13(b)), at the L-th level (in this case, level 0). FIG. 15(b) shows the contents of this process 1604.

The process of FIG. 15(b) is performed for all the program relation tables which belong to the L-th level. First, the table status area ST of the 0-th level program relation table indicates the normal state (step 1651). Therefore, any program whose input message function code is the function code ($FC_1$) of the output message of the pertinent program (here, $A_0$) is searched for from within the program constitution table (step 1652).

In this case, the programs $A_1$ and $A_2$ are the programs specified above. Thus, program constitution table Nos. and program Nos. corresponding to the programs $A_1$ and $A_2$ are respectively set in the program pointer areas PP of the program relation tables 1752 and 1753. Besides, the normal state is set in the table status areas ST, while L+1 (namely, "1") is set in the level areas LEV. Simultaneously, program relation table Nos. "2" and "3" corresponding to the program relation tables 1752 and 1753 are set in the upstream/downstream information part UDI of the program relation table 1751 (step 1653).

Next, the flow shifts to a step 1654. In this case, the process ends under the above condition because the programs $A_1$ and $A_2$ of the first level and the program $A_0$ of the 0-th level are separate programs. Subsequently, the flow shifts to a step 1605 in FIG. 15(a), which decides whether or not any program relation table corresponding to the (L+1)-th level exists In this case, the programs $A_1$ and $A_2$ exist as the programs corresponding to the (L+1)-th level, namely, the first level. Therefore, the flow shifts to a step 1606, at which the level variable L is renewed to "1" and which is followed by the step 1604.

At the step 1604, in accordance with the flow of FIG. 15(b), a process concerning the program relation table 1752 is first performed. Since the table status area ST of the program relation table 1752 indicates the normal state, the flow shifts to the steps 1652 and 1653. At the steps 1652 and 1653, the fact that the program located one stage downstream of the program $A_1$ corresponding to the program relation table 1752 is the program $A_2$ is searched for from within the program constitution table, and program constitution table No. and program No. corresponding to the program $A_2$ are set in the program pointer area PP of the program relation table 1754. Besides, the normal state is set in the table status area ST of the same program relation table, while L+1 (namely, "2") is set in the level area LEV.

Further, program relation table No. "4" corresponding to the program relation table 1754 is set in the upstream/downstream information part UDI of the program relation table 1752. Subsequently, the flow shifts to the step 1654 so as to decide whether or not any program relation tables corresponding to the program $A_2$ to which the program relation table 1754 of the second level corresponds exist at the zeroth and first levels. Since, in this case, the program relation table 1753 of the first level is a table corresponding to the program $A_2$ likewise to the program relation table 1754 of the second level, the processing flow shifts to a step 1655.

At the step 1655, the table status area ST of the program relation table 1753 is altered from the normal state to the connecting state, and program relation table No. "4" corresponding to the program relation table 1754 is set in the upstream/downstream information part UDI. Here, the "connecting state" of the program relation table signifies that any program corresponding to the particular table does not exist and that the table merely indicates the connection of messages.

Subsequently, the process of FIG. 15(b) is executed for the other program relation table 1753 of the first level. Since, in this case, the table 1753 is in the connecting state (step 1651), the steps 1652-1653 are not performed. Then, the step 1604 in FIG. 15(a) ends. The second level exists at the step 1605, so that the level variable L is renewed to "2," and the flow shifts to the step 1604 again.

Figure 10:
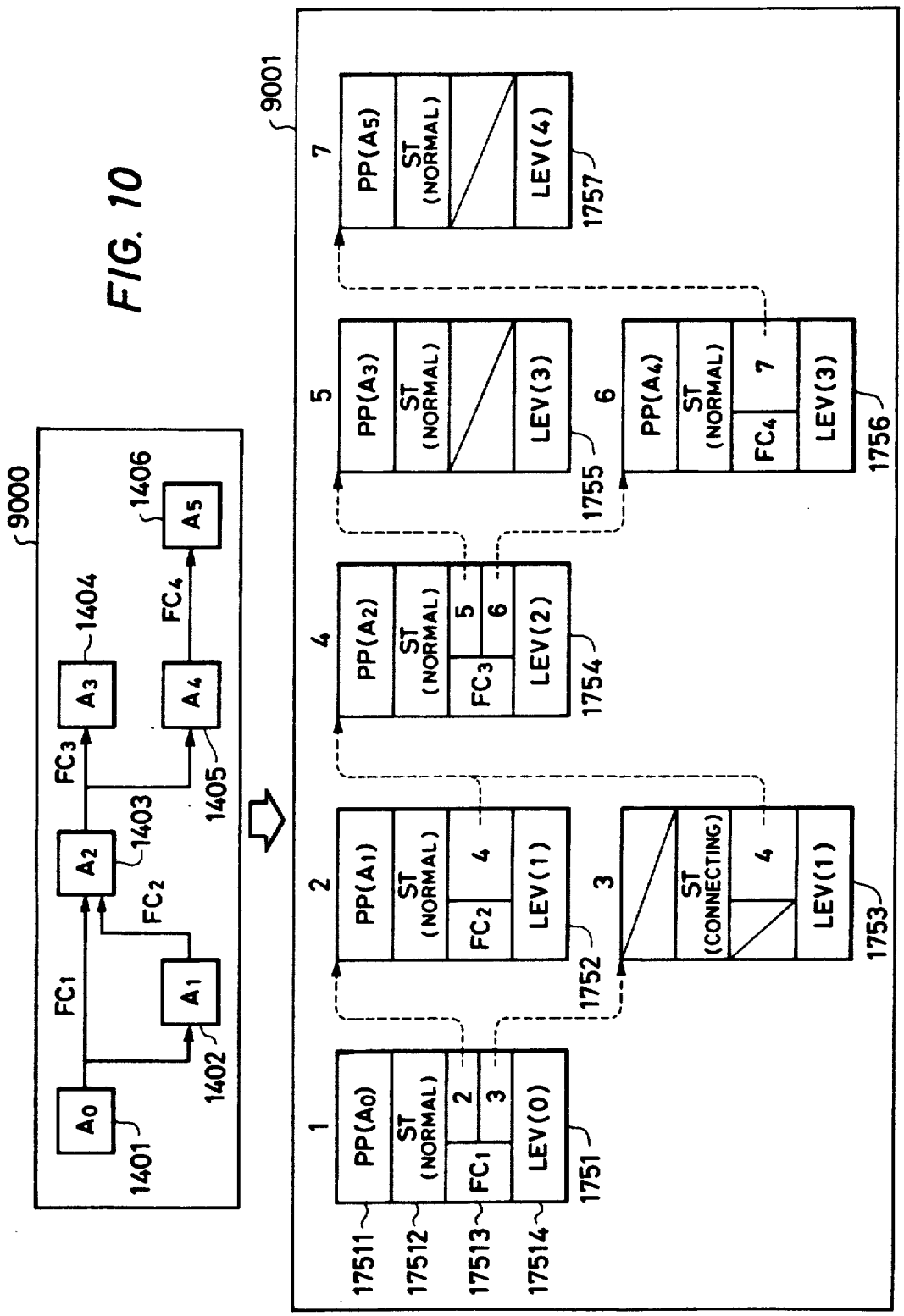
FIG. 10 is a diagram showing a program-related table which is generated by an embodiment of the present invention.

Thenceforth, the steps 1604-1606 are similarly repeated, whereby a group of program relation tables 9001 as shown in FIG. 10 are eventually generated in correspondence with the program constitution illustrated in FIG. 13(a). In FIG. 10, the module relation diagram 9000 depicted in FIG. 13(a) is appended. Broken lines in FIG. 10 indicate the relations among the program relation tables. There is not the downstream table of the program relation table 1757 of the fourth level in FIG. 10, that is, a table at the fifth level. In consequence of the decision of the step 1605 in FIG. 15(a), therefore, the processing flow shifts to a step 1607 at which the contents of the generated program relation tables are delivered to the CRT 14000.

The processes thus far described elucidate the case of retrieving the group of programs located downstream as viewed on the message flow of the designated program. In case of retrieving a group of programs located upstream, quite similar processes are feasible. In this case, however, there is required the alteration that, when the program constitution table is searched at the step 1653 in FIG. 15(b), a program which delivers the input message of the pertinent program is searched for instead of the program which receives the output message of the pertinent program.

According to the embodiment, with respect to any desired program, information which indicates a group of programs lying upstream or downstream on a message flow can be automatically generated.

In the embodiment, regarding only the program designated by an operator, the information of the group of programs lying upstream or downstream thereof is automatically generated. However, a process for searching out all programs the function codes of the input messages of which are not registered in the IFC parts, from within the program constitution tables shown in FIG. 14(a) is added, and a group of programs located downstream of each of the programs are retrieved by the use of the processes shown in FIGS. 15(a) and 15(b), whereby as to all the programs in the system, information relating them can be automatically generated.

Besides, although the second embodiment is directed toward the system constructed of a plurality of processors, it is needless to say that the present invention is also applicable to a system made up of only one processor.

As described above, according to the second embodiment of the present invention, in a system wherein a series of processes are executed by a plurality of programs, the relation among programs corresponding to the flow of the series of processes is grasped using information on the input/output data of each of the programs The invention therefore achieves the remarkable effect that, in the processing system for executing the series of processes by means of the plurality of programs, the information indicative of the relation among the individual programs existing in the system can be automatically generated, so the maintenance and operation efficiencies of the system are enhanced.

We claim:

1. A distributed processing system comprising:

a common transmission line; and a plurality of processors connected to said common transmission line wherein each processor has stored therein in a particular sequence a plurality of executable programs, said each processor comprises means for generating a program constitution message for identifying a current state of said sequence of executable programs stored in said each processor, said program constitution message including information related to at least a processor which is enabled to execute each of said executable programs, input data, indicating at least a program, being inputted to each of said plurality of executable programs and output data, indicating at least a program, being outputted from each of said plurality of executable programs, and means for sending said program constitution message, generated by said generating means, onto said common transmission line;

wherein at least one processor includes means for gathering said program constitution message sent from at least another processor through said common transmission line so as to recognize a program constitution in said system by the use of the gathered program constitution message.

2. A distributed processing system as defined in claim 1, wherein said program constitution message includes information on existence of an executable program which uses the output message from each of said executable programs in said system.

3. A distributed processing system as defined in claim 1, wherein said program constitution message includes information about the input and output of each of said executable programs in said system.

4. A distributed processing system comprising:

a common transmission line; and a plurality of processors connected to said common transmission line wherein each processor has stored therein in a particular sequence a plurality of executable programs, said each processor comprises means for generating a program constitution message for identifying said sequence of executable programs stored in said each processor, said program constitution message including information related to at least a processor which is enabled to execute each of said executable programs, input data, indicating at least a program, being inputted to each of said plurality of executable programs and output data, indicating at least a program, being outputted from each of said plurality of executable programs, and means for sending said program constitution message, generated by said generating means, onto said common transmission line;

wherein at least one processor includes means for gathering said program constitution message sent from at least another processor through said common transmission line so as to recognize a program constitution in said system by the use of the gathered program constitution message;

wherein said means for generating a program constitution message generates said program constitution message when a program constitution in said each processor has changed.

5. A distributed processing system comprising:

a common transmission line; and a plurality of processors connected to said common transmission line wherein each processor has stored therein in a particular sequence a plurality of executable programs, said each processor comprises means for generating a program constitution message for identifying said sequence of executable programs stored in said each processor, said program constitution message including information related to at least a processor which is enabled to execute each of said executable programs, input data, indicating at least a program, being inputted to each of said plurality of executable programs and output data, indicating at least a program, being outputted from each of said plurality of executable programs, and means for sending said program constitution message, generated by said generating means, onto said common transmission line;

wherein at least one processor includes means for gathering said program constitution message sent from at least another processor through said common transmission line so as to recognize a program constitution in said system by the use of the gathered program constitution message;

wherein said means for gathering comprises:

means for checking an error of a relation among said plurality of executable programs by checking consistency among information related to said input data and said output data of the gathered programs.

6. A processing method in a distributed processing system having a plurality of processors connected to a common transmission line, said method comprising the steps of:

generating, in each processor, a program constitution message for identifying a current state of said particular sequence of executable programs relating to respective executable programs stored in said sequence in said each processor, said program constitution message including information related to at least a processor which is enabled to execute each of said executable programs, input data, indicating at least a program, being inputted to each of said plurality of executable programs, and output data, indicating at least a program, being outputted from each of said plurality of executable programs;

sending from each processor said generated program constitution message onto said common transmission line; and gathering in at least one processor said program constitution message sent from at least another processor through said common transmission line so as to recognize a program constitution in said system by use of the gathered program constitution message.

7. A distributed processing system comprising:

a common transmission line; and a plurality of processors connected to said common transmission line wherein each processor has stored therein in a particular sequence a plurality of executable programs, said each processor comprises means for generating a program constitution message for identifying said sequence of executable programs stored in said each processor, said program constitution message including information related to at least a processor which is enabled to execute each of said executable programs, input data, indicating at least a program, being inputted to each of said plurality of executable programs and output data, indicating at least a program, being outputted from each of said plurality of executable programs, and means for sending said program constitution message, generated by said generating means, onto said common transmission line;

wherein at least one processor includes means for gathering said program constitution message sent from at least another processor through said common transmission line so as to recognize a program constitution in said system by the use of the gathered program constitution message;

wherein said means for gathering comprises:

means for recognizing a relation among said executable programs according to a flow of a series of processes on the basis of said information related to said input data and said output data of each of said executable programs.

8. A distributed processing system comprising:

a common transmission line; and a plurality of processors connected to said common transmission line wherein each of said processors comprises at least an executable program, means for generating a program constitution message for a sequence of a plurality of said executable programs, said program constitution message including information related to input data necessary for executing each of said plurality of executable programs and output data from each of said plurality of executable programs, and means for sending said program constitution message generated by said generating means, onto said common transmission line;

wherein at least one processor includes means for gathering said program constitution message sent from at least another processor through said common transmission line so as to recognize a program constitution in said system by the use of the gathered program constitution message;

wherein said means for gathering includes means for recognizing a relation among said executable programs according to a flow of a series of processes on the basis of said information related to said input data and said output data of each of said executable programs;

wherein information which relates any desired program to a program that receives data delivered by the desired program is employed as said information related to said input data and said output data of each of said executable programs.

9. A distributed processing system comprising:

a common transmission line; and a plurality of processors connected to said common transmission line wherein each of said processors comprises at least an executable program, means for generating a program constitution message for a sequence of a plurality of said executable programs, said program constitution message including information related to input data necessary for executing each of said plurality of executable programs and output data from each of said plurality of executable programs, and means for sending said program constitution message generated by said generating means, onto said common transmission line;

wherein at least one processor includes means for gathering said program constitution message sent from at least another processor through said common transmission line so as to recognize a program constitution in said system by the use of the gathered program constitution message;

wherein said means for gathering includes means for recognizing a relation among said executable programs according to a flow of a series of processes on the basis of said information related to said input data and said output data of each of said executable programs;

wherein information which relates any desired program to a program that delivers data to be received by the desired program is employed as said information related to said input data and said output data of each of said executable programs.

10. A processing method in a distributed processing system having a plurality of processors connected to a common transmission line, said method comprising the steps of:

generating in each processor a program constitution message for identifying a particular sequence of a plurality of executable programs relating to respective executable programs stored in said sequence in said each processor, said program constitution message including information related to at least a processor which is enabled to execute each of said executable programs, input data, indicating at least a program, being inputted to each of said plurality of executable programs, and output data, indicating at least a program, being outputted from each of said plurality of executable programs;

sending from each processor said generated program constitution message onto said common transmission line; and gathering in at least one processor said program constitution message sent from at least another processor through said common transmission line so as to recognize a program constitution in said system by use of the gathered program constitution message;

wherein said gathering step includes a step of:

recognizing a relation among programs according to a flow of a series of processes on the basis of said information related to said input data and said output data of each of said executable programs.

* * * * *